United States Patent
Nardozza et al.

(10) Patent No.: US 11,973,629 B2
(45) Date of Patent: Apr. 30, 2024

(54) NON-DISRUPTIVE PHASED ARRAY CALIBRATION FOR FDD AND TDD COMMUNICATION SYSTEMS

(71) Applicant: NEC Advanced Networks, Inc., New Providence, NJ (US)

(72) Inventors: Gregg S. Nardozza, Madison, NJ (US); Giovanni Marzin, San Michele al Tagliamento (IT); Yiping Feng, Skillman, NJ (US); Robert C. Frye, Piscataway, NJ (US); Mihai Banu, New Providence, NJ (US)

(73) Assignee: NEC Advanced Networks, Inc., New Providence, NJ (US)

( * ) Notice: Subject to any disclaimer, the term of this patent is extended or adjusted under 35 U.S.C. 154(b) by 0 days.

(21) Appl. No.: 17/959,711

(22) Filed: Oct. 4, 2022

(65) Prior Publication Data
US 2023/0106538 A1    Apr. 6, 2023

Related U.S. Application Data
(60) Provisional application No. 63/251,858, filed on Oct. 4, 2021.

(51) Int. Cl.
*H04L 27/26* (2006.01)
*H04B 17/21* (2015.01)

(52) U.S. Cl.
CPC ......... *H04L 27/2666* (2013.01); *H04B 17/21* (2015.01); *H04L 27/2646* (2013.01)

(58) Field of Classification Search
CPC . H04L 27/2666; H04L 27/2646; H04B 17/21; H04B 17/14; H04B 17/00; H04B 17/0082; H04B 17/0085; H04B 17/0087; H04B 17/13; H04B 17/12; H04B 17/16;
(Continued)

(56) References Cited

U.S. PATENT DOCUMENTS

| | | | |
|---|---|---|---|
| 6,788,948 B2 * | 9/2004 | Lindskog | H01Q 3/267 455/67.14 |
| 2012/0087230 A1 | 4/2012 | Guo et al. | |
| 2017/0288853 A1 * | 10/2017 | Oster | H04B 7/18515 |

OTHER PUBLICATIONS

Lin Yujie et al., "Calibration for spaceborne phased array antennas without interrupting satellite conununications", 2017 9th International Conference on Wireless Communications and Signal Processing (WCSP), IEEE, Oct. 11, 2017 (Oct. 11, 2017), pp. 1-5, XP033264480, DOI: 10.1109/WCSP .2017 .8171093 [retrieved on Dec. 7, 2017].

* cited by examiner

*Primary Examiner* — Khanh C Tran
(74) *Attorney, Agent, or Firm* — Occhiuti & Rohlicek LLP

(57) ABSTRACT

A method of calibrating a transmitter chain in a phased array system in which a lower guard band is assigned to a lower side of an operating carrier of a communication channel and an upper guard band is assigned an upper side of the operating carrier includes injecting a first calibration tone into the transmitter chain and detecting its arrival at the end of the transmitter chain, at which point a first detected calibration signal is generated. The first detected calibration signal and the injected first calibration tone are then compared to produce a first comparison signal. The transmitter chain's phase and/or gain is then adjusted based on this first comparison signal. The first calibration tone located within one of the lower and upper guard bands of the communication channel of the transmitter chain.

14 Claims, 7 Drawing Sheets

(58) Field of Classification Search
CPC ...... H04B 17/19; H04B 17/18; H04B 17/297; H04B 17/296
See application file for complete search history.

NON-DISRUPTIVE PHASED ARRAY CALIBRATION FOR FDD AND TDD COMMUNICATION SYSTEMS

CROSS REFERENCE TO RELATED APPLICATIONS

This application claims the benefit of the priority date of U.S. Application No. 63/251,858, filed on Oct. 4, 2021, the contents of which are hereby incorporated by reference in their entirety.

BACKGROUND

Phased array communication systems must be calibrated on a regular basis to maintain gain and phase coherence among all antenna elements. One method is to calibrate each element in a round-robin fashion to adjust for transmitter and receiver chain device variations with temperature changes. Calibration would be done on a per-element basis, one at a time, by taking the element out of service. The calibration tone can simply be a continuous sinewave tone placed at the center of the communication signal. Issues can arise with the transmission of the calibration tone, which will be discussed later; customer perception is also an issue. Disconnecting an antenna element during calibration is disadvantageous, requiring some type of high-isolation RF switch or RF relay, which takes up additional physical space, adds cost, and adds additional insertion loss.

SUMMARY

In one aspect, the invention features a method of calibrating a transmitter chain in a phased array system in which a lower guard band is assigned to a lower side of an operating carrier, or channel, of a communication channel and an upper guard band is assigned an upper side of the operating carrier. Such a method includes injecting a first calibration tone into the transmitter chain, said first calibration tone located within one of the lower and upper guard bands of the communication channel of the transmitter chain; detecting the first calibration tone arriving at the end of the transmitter chain to generate a first detected calibration signal; comparing the first detected calibration signal to the injected first calibration tone to produce a first comparison signal; and adjusting one or more of the phase and or gain of the transmitter chain based on the first comparison signal.

Among the practices of the foregoing method are those in which the lower guard band is chosen, in which case the method includes injecting a second calibration tone into the transmitter chain, said second calibration tone located within the upper guard band of the communication channel of the transmitter chain, detecting the second calibration tone arriving at the end of the transmitter chain to generate a second detected calibration signal, and comparing the second detected calibration signal to the injected second calibration tone to produce a second comparison signal. In such practices, the adjustment of the phase and/or gain of the transmitter chain is based on the first and second comparison signals.

In another aspect, the invention features calibrating a transmitter chain in a phased array system in which a guard period is implemented during which the phased array system is not communicating with any mobile devices. Such a calibration method includes injecting a calibration tone into the transmitter chain during the guard period, detecting the calibration tone arriving at the end of the transmitter chain to generate a detected calibration signal, comparing the detected calibration signal to the injected calibration tone to produce a comparison signal, and adjusting the phase and/or gain of the transmitter chain based on the comparison signal.

Practices of the foregoing calibration method include those in which the guard period is assigned between an end of a transmission period and a beginning of a reception period, those in which the guard period is between a transmission period and a reception period, those in which the guard period is adjacent to a reception period, and those in which the guard period is adjacent to a transmission period.

In another aspect, the invention features a method of calibrating a receiver chain in a phased array system in which a lower guard band is assigned to a lower side of an operating carrier of a communication channel and an upper guard band is assigned an upper side of the operating carrier. Such a method includes injecting a first injected calibration signal into the receiver chain, said first calibration signal located within one of the lower and upper guard bands of the communication channel of the receiver chain, detecting the first calibration signal arriving at the end of the receiver chain to generate a first detected calibration signal, comparing the first detected calibration signal to the injected first calibration signal to produce a first comparison signal, and adjusting the phase and/or gain of the receiver chain based on the first comparison signal.

In some practices of the foregoing method, it is the lower guard band that is used. In such practices, the method includes injecting a second injected calibration signal into the receiver chain, this second calibration signal being located within the upper guard band of the communication channel of the receiver chain. The method continues with detecting the second calibration signal arriving at the end of the receiver chain to generate a second detected calibration signal and comparing the second detected calibration signal to the injected second calibration signal to produce a second comparison signal. In such practices, adjusting the phase and/or gain of the receiver chain is based on the first and second comparison signals.

In another aspect, the invention features a method of calibrating a receiver chain in a phased array system in which a guard period is implemented during which the phased array system is not communicating with any mobile devices. Such a method includes injecting a calibration signal into the receiver chain during the guard period, detecting the calibration signal arriving at the end of the receiver chain to generate a detected calibration signal, comparing the detected calibration signal to the injected calibration signal to produce a comparison signal, and adjusting the phase and/or gain of the receiver chain based on the comparison signal.

Practices of the foregoing method include those in which the guard period is assigned between an end of a transmission period and a beginning of a reception period, those in which the guard period is between a transmission period and a reception period, those in which the guard period is adjacent to a reception period, and those in which the guard period is adjacent to a transmission period.

These and other features of the invention will be apparent from the following description and the figures, in which:

DETAILED DESCRIPTION

Figure 1:
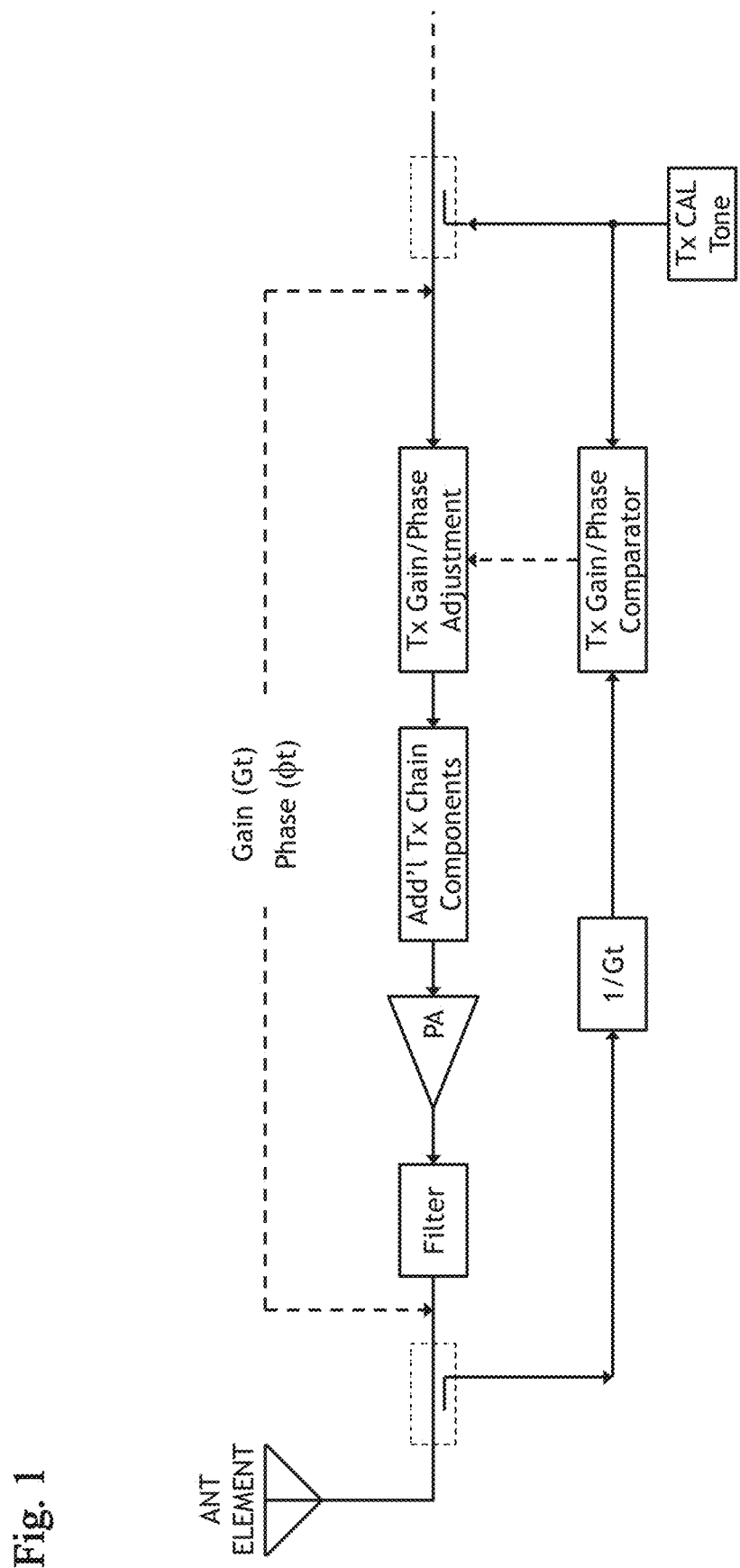
FIG. 1 shows a calibration tone injected into a transmitter chain.

Transmitter calibration can be accomplished by injecting a calibration tone 12 through the transmitter chain 14 and calibrating the gain and phase by comparing the resulting calibration tone at the end of the transmitter chain 14 to a reference signal, typically through a directional coupler 16 placed just before the radiating antenna element 18 (FIG. 1). The problem with this is that the in-band calibration tone 12 is transmitted from the array element 18 along with the wanted communication carrier, which can disadvantageously affect the error vector magnitude (EVM) of the transmitter signal or directly interfere with the center channel data transmission, and ultimately degrade the data throughput to the mobile device.

Figure 2:
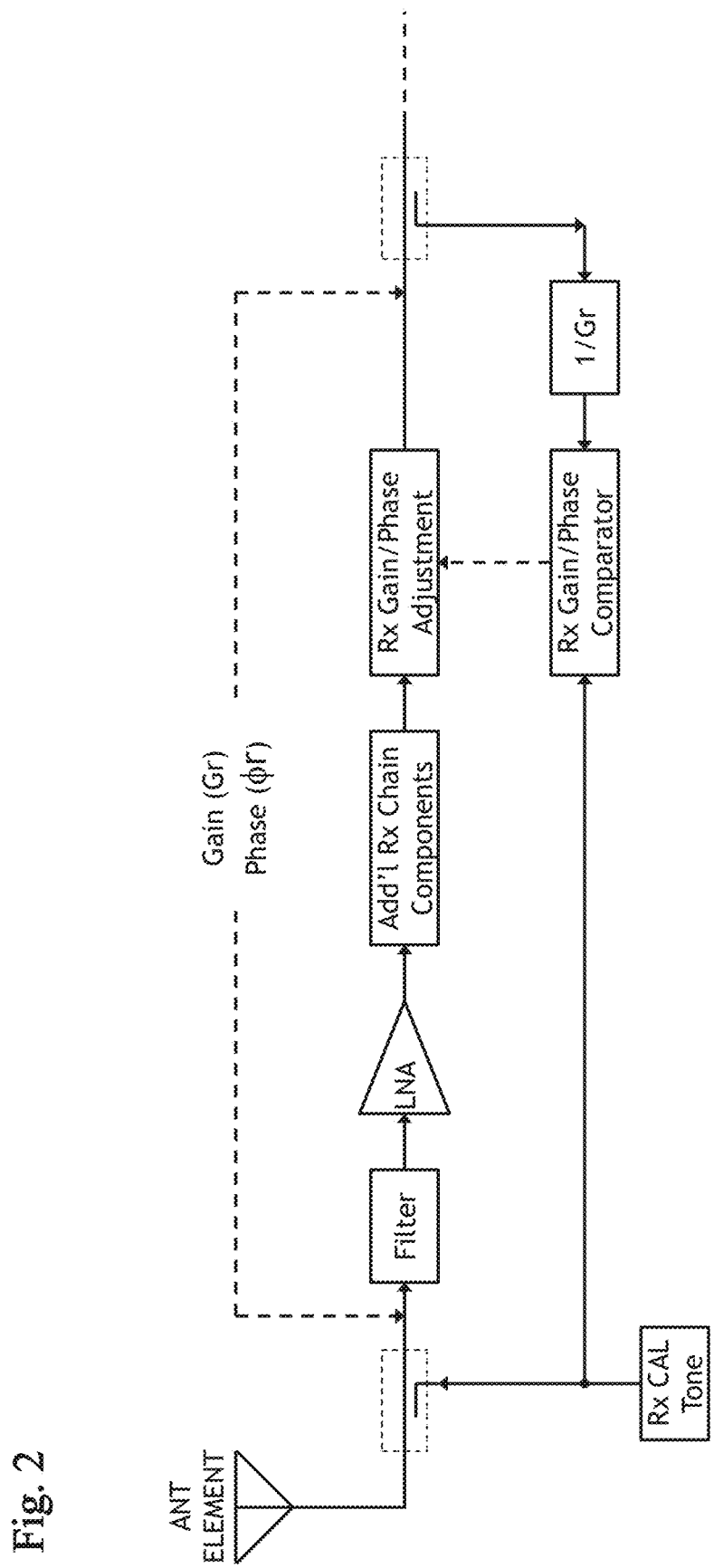
FIG. 2 shows a calibration tone injected into a receiver chain.

Receiver calibration can be accomplished by injecting a calibration tone 12 into the receiver chain 24 via a directional coupler 16 at the antenna element 18 and calibrating the gain and phase by comparing the resulting calibration tone at the end of the receiver chain 24 to a reference signal (FIG. 2). The problem with this is that the in-band calibration tone appears at the ADC and can affect the throughput of the signal received by the mobile device. Also, the phase noise of the calibration tone generator 10 can desensitize the entire phased array receiver if it is not well below the system noise floor level at the analog-to-digital converter (ADC).

There are two types of LTE/5GNR communication systems: FDD (frequency division duplex) and TDD (time division duplex). In FDD systems, the transmitter and receiver operate in full duplex over two distinct and separated frequency bands. In TDD systems, the transmitter and receiver operate in the same frequency band with different assigned times periods in which to either transmit or receive.

Figure 3:
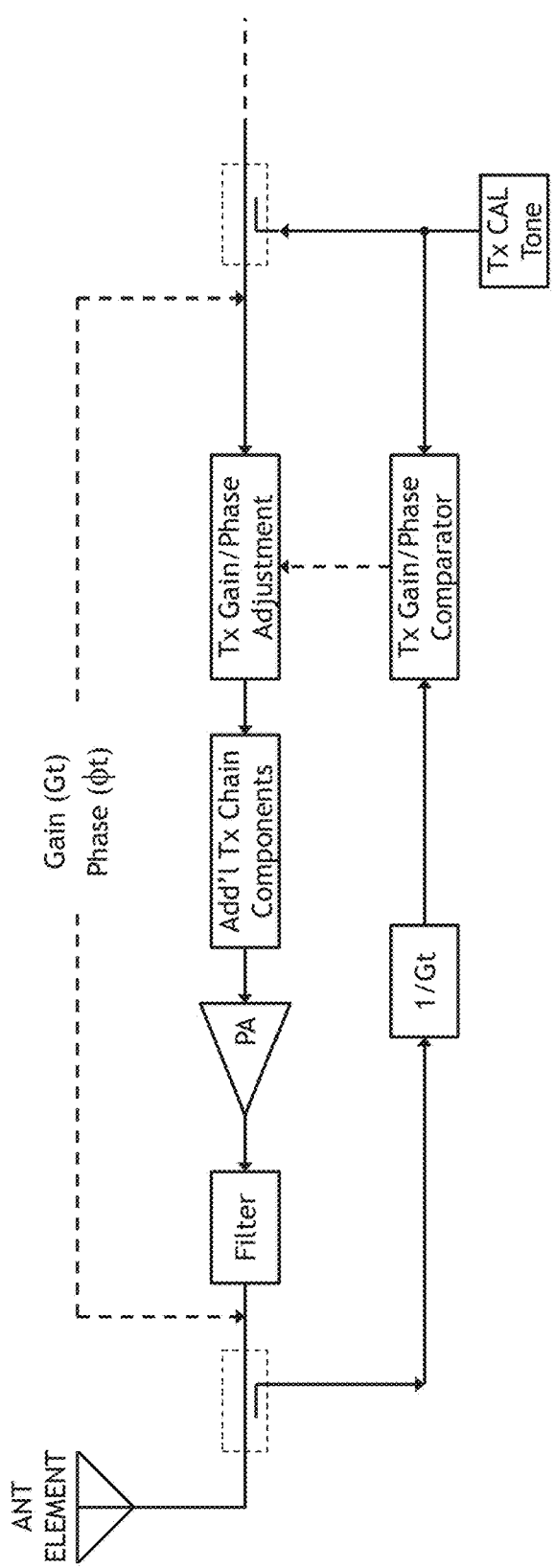
FIGS. 3 and 4 show insertion of calibration tones in upper and lower guard bands for an FDD system using the configurations of FIGS. 1 and 2.
Figure 3:
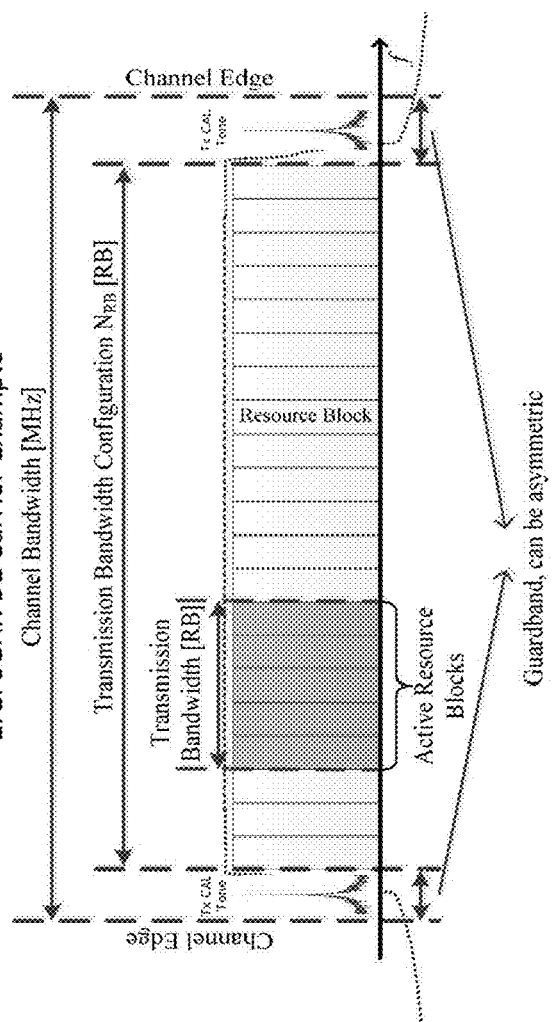
Figure 4:
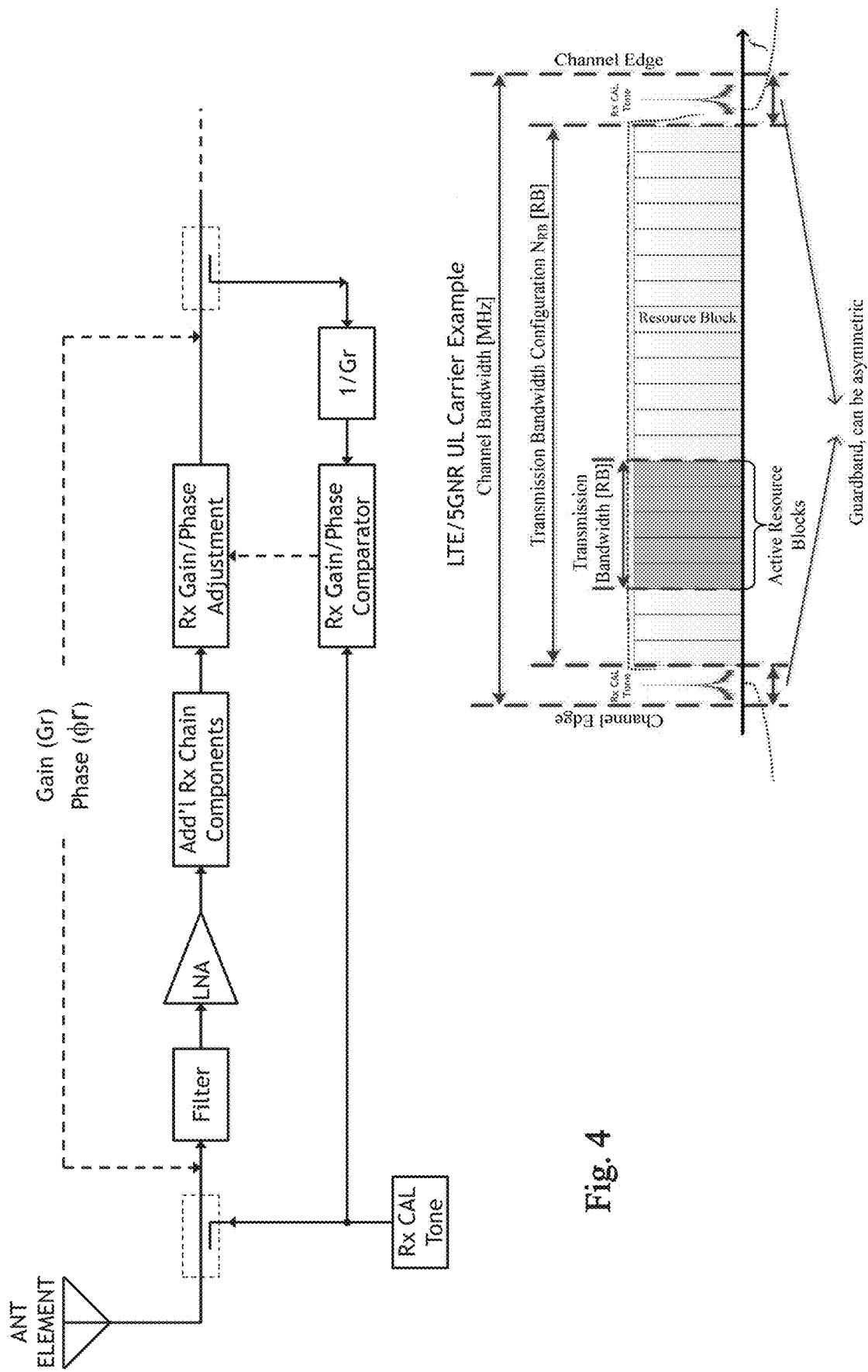

In the LTE/5GNR FDD communication system there are guard bands 26, 28 assigned to each operating carrier on both the upper and lower side of the carrier 30. For example, a 20 MHz LTE carrier has an operating bandwidth of 18 MHz, with 1 MHz of guard band on either side. Ideally, calibration would be done by placing a calibration tone 12 in the center of the operating carrier 30, but the transmission of this tone 12 over the air could potentially interfere with the main communication channel 30. The idea of one embodiment is to place the calibration tone 12 in the guard band 26, 28 of the main communication channel 30, calibrate the system at the low and high ends of the carrier 30, and average the two results, in lieu of calibrating in the center (FIGS. 3 and 4).

Figure 5:
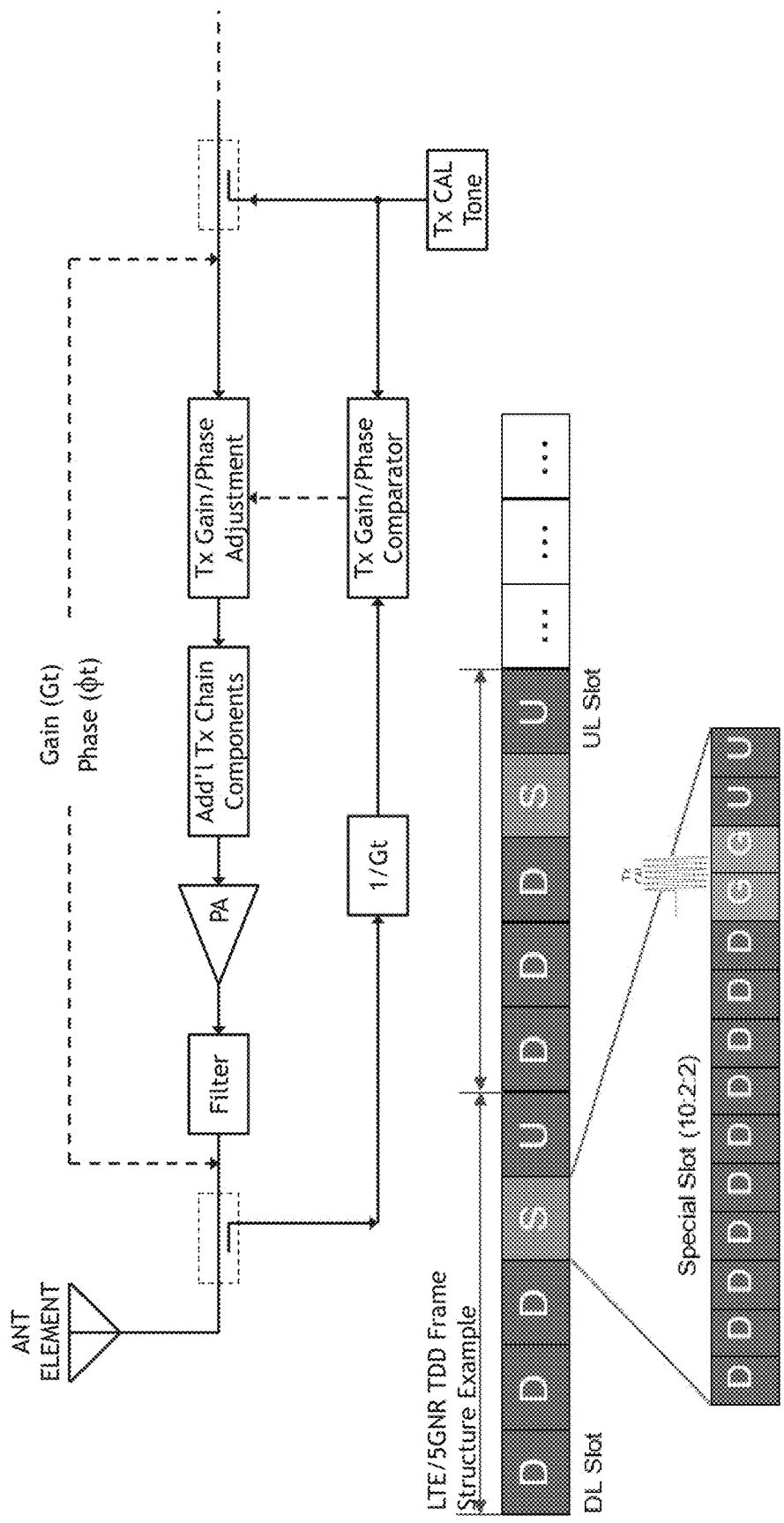
FIGS. 5 and 6 shows a calibration approach similar to that shown in FIGS. 3 and 4 but for a TDD system.
Figure 6:
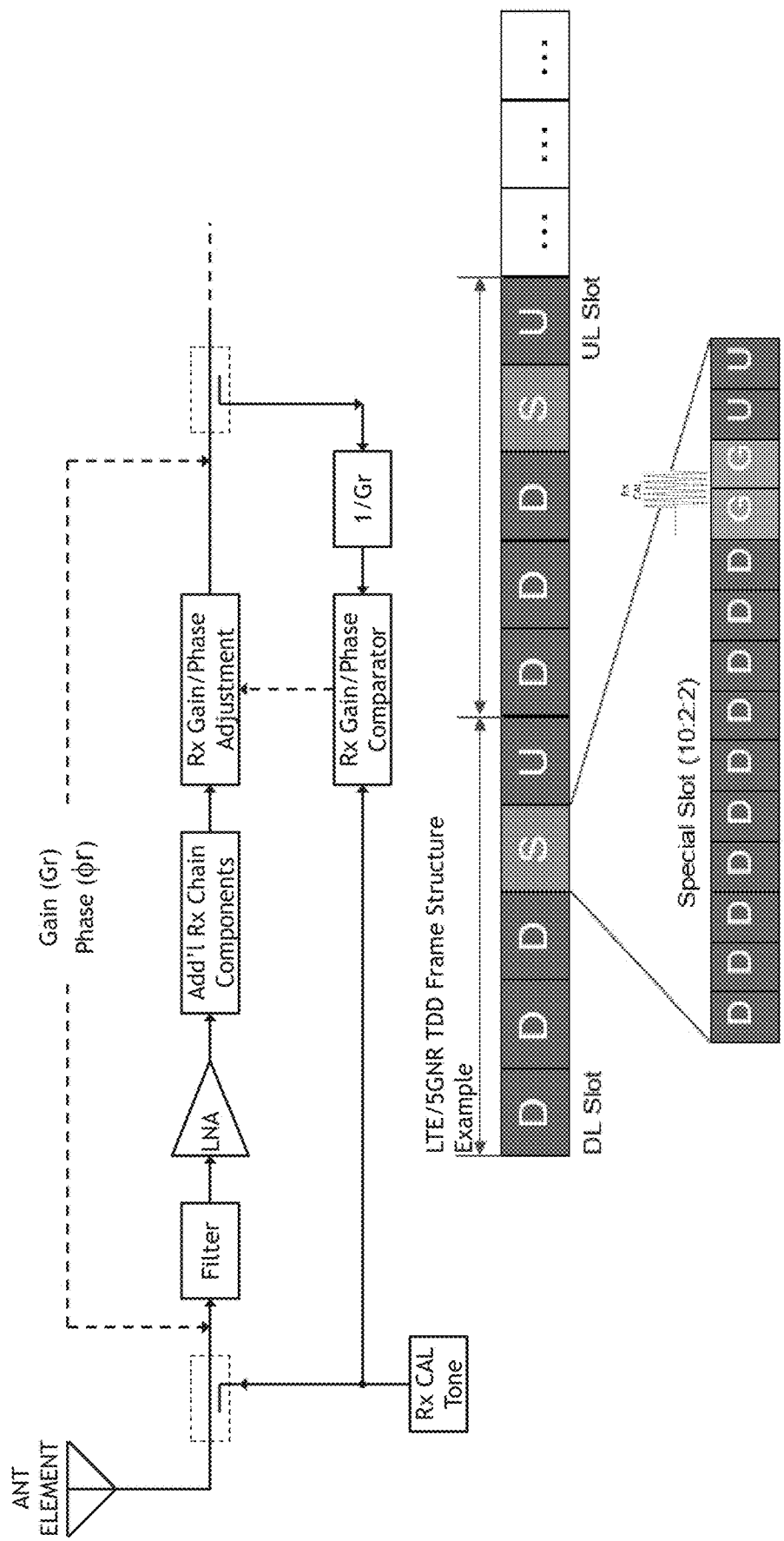

In the LTE/5GNR TDD communication system there are guard periods G assigned between the end of the transmission period D and the beginning of the reception period U. For example, a repetitive LTE timing structure could be a transmission period D of 7 msec, guard period of 1 msec, and reception period U of 2 msec. The idea of another embodiment is to perform calibration during the guard period G when the system is neither transmitting nor receiving. This allows for placement of the calibration tone 12 directly in the center of the main communication channel 30 without having to use the guard bands 26, 28. The challenge with this method is that the guard period G can be very small in some cases (e.g., worst case: 16.7 μsec in 5GNR with FR1/SCS60). However, the minimum required calibration period is on the order of 0.5 μsec, thus the entire guard period need not be used for calibration (FIGS. 5 and 6).

Note that the implementation of a guard period G between only the end of the DL period and the beginning of the UL period is a specific implementation of LTE and 5GNR. In general, the guard period is a waiting period for the end of the base station DL transmission to reach all of the mobiles (UEs) before transmitting back to the base station. The larger the cell radius, the longer the guard period is to be set. No guard period is required after the last UL transmission because LTE/5GNR base station issues a unique timing advance to each UE so that all UL transmission from each of the UEs reach the base station simultaneously and with individual propagation time accounted for. However, a general TDD system can be envisioned in which a guard period is required in both directions or perhaps only between the UL and DL transmission.

Figure 7:
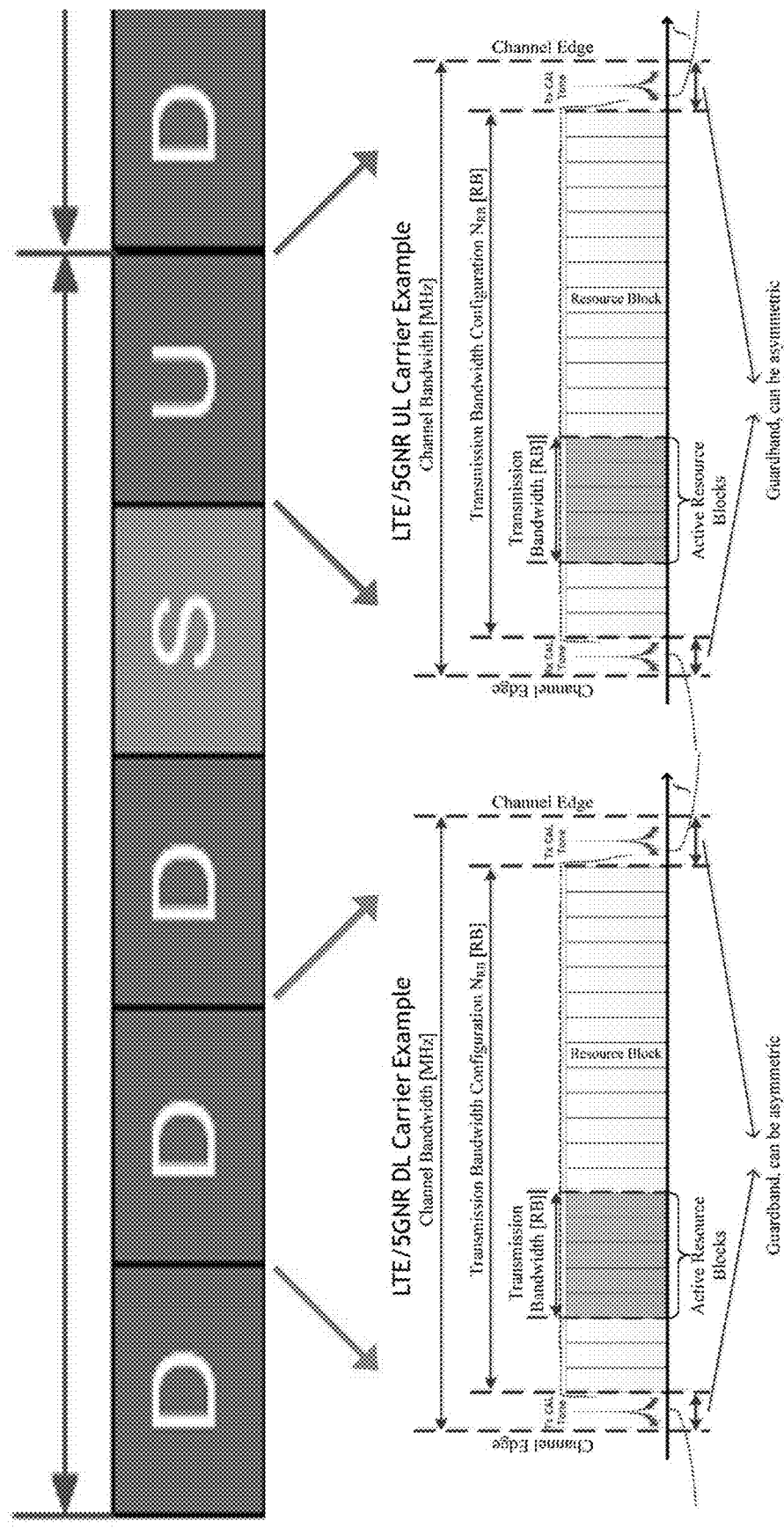
FIG. 7 shows insertion of calibration tones in upper and lower guard bands during uplink and downlink periods in a TDD system.

Note also that the same, previously described FDD calibration methods can be applied to TDD as another option, in lieu of calibrating during the guard period. The transmitter can be calibrated during the allocated transmission time utilizing the guard bands 26, 28 of the communication carrier. Similarly, the receiver can be calibrated during the allocated reception time utilizing the guard bands 26, 28 of the communication channel (FIG. 7).

The invention claimed is:

1. A method of calibrating a transmitter chain in a phased array system in which a lower guard band is assigned to a lower side of an operating carrier of a communication channel and an upper guard band is assigned an upper side of the operating carrier, said method comprising:
    injecting a first calibration tone into the transmitter chain, said first calibration tone located within one of the lower and upper guard bands of the communication channel of the transmitter chain;
    detecting the first calibration tone arriving at the end of the transmitter chain to generate a first detected calibration signal;
    comparing the first detected calibration signal to the injected first calibration tone to produce a first comparison signal; and
    adjusting the phase and/or gain of the transmitter chain based on the first comparison signal.

2. The method of claim 1, wherein said one of the upper and lower guard bands is the lower guard band, said method further comprising:
    injecting a second calibration tone into the transmitter chain, said second calibration tone located within the upper guard band of the communication channel of the transmitter chain;
    detecting the second calibration tone arriving at the end of the transmitter chain to generate a second detected calibration signal; and
    comparing the second detected calibration signal to the injected second calibration tone to produce a second comparison signal,
    wherein adjusting the phase and/or gain of the transmitter chain is based on the first and second comparison signals.

3. A method of calibrating a transmitter chain in a phased array system in which a guard period is implemented during which the phased array system is not communicating with any mobile devices, said method comprising:
- injecting a calibration tone into the transmitter chain during the guard period;
- detecting the calibration tone arriving at the end of the transmitter chain to generate a detected calibration signal;
- comparing the detected calibration signal to the injected calibration tone to produce a comparison signal; and
- adjusting the phase and/or gain of the transmitter chain based on the comparison signal.

4. The method of claim 3 wherein the guard period is assigned between an end of a transmission period and a beginning of a reception period.

5. The method of claim 3, wherein the guard period is between a transmission period and a reception period.

6. The method of claim 3, wherein the guard period is adjacent to a reception period.

7. The method of claim 3, wherein the guard period is adjacent to a transmission period.

8. A method of calibrating a receiver chain in a phased array system in which a lower guard band is assigned to a lower side of an operating carrier of a communication channel and an upper guard band is assigned an upper side of the operating carrier, said method comprising:
- injecting a first injected calibration signal into the receiver chain, said first calibration signal located within one of the lower and upper guard bands of the communication channel of the receiver chain;
- detecting the first calibration signal arriving at the end of the receiver chain to generate a first detected calibration signal;
- comparing the first detected calibration signal to the injected first calibration signal to produce a first comparison signal; and
- adjusting the phase and/or gain of the receiver chain based on the first comparison signal.

9. The method of claim 8, wherein said one of the upper and lower guard bands is the lower guard band, said method further comprising:
- injecting a second injected calibration signal into the receiver chain, said second calibration signal located within the upper guard band of the communication channel of the receiver chain;
- detecting the second calibration signal arriving at the end of the receiver chain to generate a second detected calibration signal; and
- comparing the second detected calibration signal to the injected second calibration signal to produce a second comparison signal,
- wherein adjusting the phase and/or gain of the receiver chain is based on the first and second comparison signals.

10. A method of calibrating a receiver chain in a phased array system in which a guard period is implemented during which the phased array system is not communicating with any mobile devices, said method comprising:
- injecting a calibration signal into the receiver chain during the guard period;
- detecting the calibration signal arriving at the end of the receiver chain to generate a detected calibration signal;
- comparing the detected calibration signal to the injected calibration signal to produce a comparison signal; and
- adjusting the phase and/or gain of the receiver chain based on the comparison signal.

11. The method of claim 10, wherein the guard period is assigned between an end of a transmission period and a beginning of a reception period.

12. The method of claim 10, wherein the guard period is between a transmission period and a reception period.

13. The method of claim 10, wherein the guard period is adjacent to a reception period.

14. The method of claim 10, wherein the guard period is adjacent to a transmission period.

* * * * *